(12) United States Patent
Shechtman et al.

(10) Patent No.: US 9,014,470 B2
(45) Date of Patent: Apr. 21, 2015

(54) NON-RIGID DENSE CORRESPONDENCE

(75) Inventors: Elya Shechtman, Seattle, WA (US);
Daniel Robert Goldman, Seattle, WA (US); Yoav HaCohen, Jerusalem (IL); Daniel Lischinski, Jerusalem (IL)

(73) Assignee: Adobe Systems Incorporated, San Jose, CA (US)

( * ) Notice: Subject to any disclaimer, the term of this patent is extended or adjusted under 35 U.S.C. 154(b) by 829 days.

(21) Appl. No.: 13/223,202

(22) Filed: Aug. 31, 2011

(65) Prior Publication Data
US 2013/0129213 A1 May 23, 2013

(51) Int. Cl.
G06K 9/00 (2006.01)
G06T 7/00 (2006.01)

(52) U.S. Cl.
CPC ..... *G06T 7/0028* (2013.01); *G06T 2207/10024* (2013.01)

(58) Field of Classification Search
USPC ......... 382/162, 165, 167, 170, 205, 209, 255, 382/274, 279
See application file for complete search history.

(56) References Cited

U.S. PATENT DOCUMENTS

| | | | | |
|---|---|---|---|---|
| 8,606,050 | B2* | 12/2013 | Smith et al. | 382/305 |
| 2008/0219517 | A1* | 9/2008 | Blonk et al. | 382/118 |
| 2011/0299782 | A1* | 12/2011 | Hamsici et al. | 382/195 |

OTHER PUBLICATIONS

Barnes, C., Shechtman, E., Goldman, D. B., and Finkelstein, A. Sep. 2010. The generalized PatchMatch correspondence algorithm. In Proc. ECCV, vol. 3, 29-43.*

Zelnik-Manor, L., and Irani, M. 2006. On single-sequence and multi-sequence factorizations. Int. J. Comput. Vision 67 (May), 313-326.

Bai, X., Wang, J., Simons, D., and Sapiro, G. Aug. 2009. Video SnapCut: robust video object cutout using localized classifiers. ACM Trans. Graph. 28, 3 (July), 70:1-70:11.

Bhat, P., Zitnick, C. L., Snavely, N., Agarwala, A., Agrawala, M., Curless, B., Cohen, M., and Kang, S. B. 2007. Using photographs to enhance videos of a static scene. In Rendering Techniques 2007, Eurographics, 327-338.

Brox, T., Bregler, C., and Malik, J. 2009. Large displacement optical flow. In Proc. CVPR 2009, IEEE, 41-48.

Cho, S., and Lee, S. Dec. 2009. Fast motion deblurring. ACM Trans. Graph. 28,5 (December), 145:1-145:8.

Cho, M., Lee, J., and Lee, K. 2009. Feature correspondence and deformable object matching via agglomerative correspondence clustering. In Proc. ICCV, 1280-1287.

Dale, K., Johnson, M. K., Sunkavalli, K., Matusik, W., and Pfister, H. 2009. Image restoration using online photo collections. In Proc. ICCV, IEEE, 8 pages.

(Continued)

*Primary Examiner* — Phuoc Tran
(74) *Attorney, Agent, or Firm* — Wolfe-SBMC

(57) ABSTRACT

Non-rigid dense correspondence (NRDC) for image enhancement may be performed. In one embodiment, a correspondence may be computed for each one of a plurality of regions of a source image to one of a plurality of regions of a reference image. Computing the correspondences may include searching within a search range for each of a plurality of image characteristics. One or more of the correspondences may be aggregated into matched regions. A global color transform and/or deblurring may be applied to the source image. In one embodiment, the global color transform and/or deblurring may be based on the matched regions. At least one of the search ranges may optionally be adjusted. In some embodiments, computing, aggregating, applying and/or deblurring, and adjusting may be iteratively performed.

24 Claims, 11 Drawing Sheets

(56) References Cited

OTHER PUBLICATIONS

Eisemann, E., and Durand, F. 2004. Flash photography enhancement via intrinsic relighting. ACM Trans. Graph. 23 (August), 673-678.
Eisemann, M., Eisemann, E., Seidel, H.-P., and Magnor, M. 2010. Photo zoom: High resolution from unordered image collections. In Proc. Graphics Interface, 71-78.
Ferrari, V., Tuytelaars, T., and Gool, L. J. V. 2004. Simultaneous object recognition and segmentation by image exploration. In Proc. ECCV, vol. 1, 40-54.
Joshi, N., Matusik, W., Adelson, E. H., and Kriegman, D. J. 2010. Personal photo enhancement using example images. ACM Trans. Graph. 29, 2 (April), 12:1-12:15.
Levin, A. Fergus, R., Durand, F., and Freeman, W. T. 2007. Image and depth from a conventional camera with a coded aperture. ACM Trans. Graph. 26, 3 (July), 2 pages.
Levin, A., Weiss, Y., Durand, F., and Freeman., W. T. 2011. Efficient marginal likelihood optimization in blind deconvolution. In Proc. CVPR, IEEE, 12 pages.
Liu, C. Yuen, J., Torralba, A., Sivic, J., and Freeman, W. T. 2008. Sift flow: Dense correspondence across different scenes. In Proc. ECCV, vol. 3, 28-42.
Lowe, D. G. Jan. 5, 2004. Distinctive image features from scale-invariant keypoints. Int. J. Comput. Vision 60, 2, 91-110.
Lucas, B. D., and Kanade, T. 1981. An iterative image registration technique with an application to stereo vision. In Proc. DARPA Image Understanding Workshop, 121-130.
Matas, J., Chum, O., Urba, M., and Pajdla, T. 2002. Robust wide baseline stereo from maximally stable extremal regions. In Proc. BMVC 2002, 384-396.
Mikolajczyk, K., Tuytelaars, T., Schmid, C., Zisserman, A., Matas, J., Schaffalitzky, F., Kadir, T., and Gool, L. V. 2005. A comparison of affine region detectors. Int. J. Comput. Vision 65 (November), 43-72.
P'Erez, P., Gangnet, M., and Blake, A. 2003. Poisson image editing. ACM Trans. Graph. 22, 3 (July), 313-318.
Petschnigg, G., Szeliski, R., Agrawala, M., Cohen, M., Hoppe, H., and Toyama, K. 2004. Digital photography with flash and no-flash image pairs. ACM Trans. Graph. 23, 3 (August), 664-672.
Piti'E , F., Kokaram, A. C., and Dahyot, R. 2007. Automated colour grading using colour distribution transfer. Comput. Vis. Image Underst. 107 (July), 123-137.
Pizer, S. M., Amburn, E. P., Austin, J. D., Cromartie, R., Geselowitz, A., Greer, T., Romeny, B. T. H., and Zimmerman, J. B. 1987. Adaptive histogram equalization and its variations. Comput. Vision Graph. Image Process. 39 (September), 355-368.
Reinhard, E., Ashikhmin, M., Gooch, B., and Shirley, P. 2001. Color transfer between images. IEEE Comput. Graph. Appl. (Sep. 2001), pp. 34-41.
Rother, C., Kolmogorov, V., and Blake, A. 2004. "Grab- Cut": interactive foreground extraction using iterated graph cuts. ACM Trans. Graph. 23,3 (August), 309-314.
Rother, C., Minka, T. P., Blake, A., and Kolmogorov, V. 2006. Cosegmentation of image pairs by histogram matching—incorporating a global constraint into MRFs. In Proc. CVPR 2006, vol. 1, 993-1000.
Snavely, N., Seitz, S. M., and Szeliski, R. 2006. Photo tourism: exploring photo collections in 3D. ACM Trans. Graph. 25 (July), 835-846.
Yuan, L., Sun, J., Quan, L., and Shum, H.-Y. 2007. Image deblurring with blurred/noisy image pairs. ACM Trans. Graph. 26,3 (July)), 9 pages.
Barnes, et al.,' "The Generalized Patch Match Correspondence Algorithm", European Conference on Computer Vision, Sep. 2010, Retrieved from <http://gfx.cs.princeton.edu/pubs/Barnes_2010_TGP/generalized_pm.pdf> on Sep. 9, 2010, 14 pages.
Cho, et al.' "Co-Recognition of Image Pairs by Data-Driven Monte Carlo Image Exploration", Proceedings of ECCV, vol. 4, 2008, 15 pages.
Kagarlitsky, et al.,' "Piecewise-Consistent Color Mappings of Images Acquired Under Various Conditions", Proceedings of ICCV, 2009, 8 pages.
Liu, et al.,' "Intrinsic Colorization", SIGGRAPH Asia 2008, 9 pages.

* cited by examiner (A) Inputs   (B) SIFT   (C) SIFT-Flow   (D) GPM   (E) Our (A) Inputs   (B) Co-recognition   (C) Our

FIG. 10A          FIG. 10B
FIG. 10C

NON-RIGID DENSE CORRESPONDENCE

BACKGROUND

Establishing correspondences between images is a longstanding problem with a multitude of applications in computer vision and graphics, ranging from classical tasks like motion analysis, tracking and stereo, through 3D reconstruction, objection detection and retrieval, to image enhancement and editing. Most correspondence methods are limited in handling a variety of different scenarios. For example, in one scenario, the images are close to each other in time and in viewpoint. In another scenario, the difference in viewpoint of the images may be large, but the scene consists of mostly rigid objects. In yet another scenario, the input images share some common content, but differ significantly due to a variety of factors, such as non-rigid changes in the scene, changes in lighting and/or tone mapping, and different cameras and lenses. The latter scenario is common in personal photo albums, which typically contain the same subjects photographed under different conditions. Current methods struggle to handle one or more of these types of scenarios.

SUMMARY

This disclosure describes techniques and structures for non-rigid dense correspondence (NRDC). In one embodiment, a correspondence may be computed for each one of a plurality of patches of a source image to one of a plurality of patches of a reference image. Computing the correspondences may include searching within a search range for each of a plurality of image characteristics. In one embodiment, one or more of the correspondences may be aggregated into matched regions. A global color transform may be applied to the source or reference image. In one embodiment, the global color transform may be based on estimated differences between the source image and the reference image in the matched regions. At least one of the search ranges may be adjusted. In some embodiments, computing, aggregating, applying, and adjusting may be iteratively performed, in a coarse-to-fine manner.

In some embodiments, before adjusting at least one of the search ranges, the color transformed source image may be deblurred based on the matched regions. In other embodiments, the source image may be deblurred without performing the global color transform. In either case, the deblurring may be part of the iterative computing, aggregating, and adjusting.

BRIEF DESCRIPTION OF THE DRAWINGS

FIGS. 9A-10C illustrate representative results for adjusting color and exposure of an image, according to some embodiments.

Figure 1:
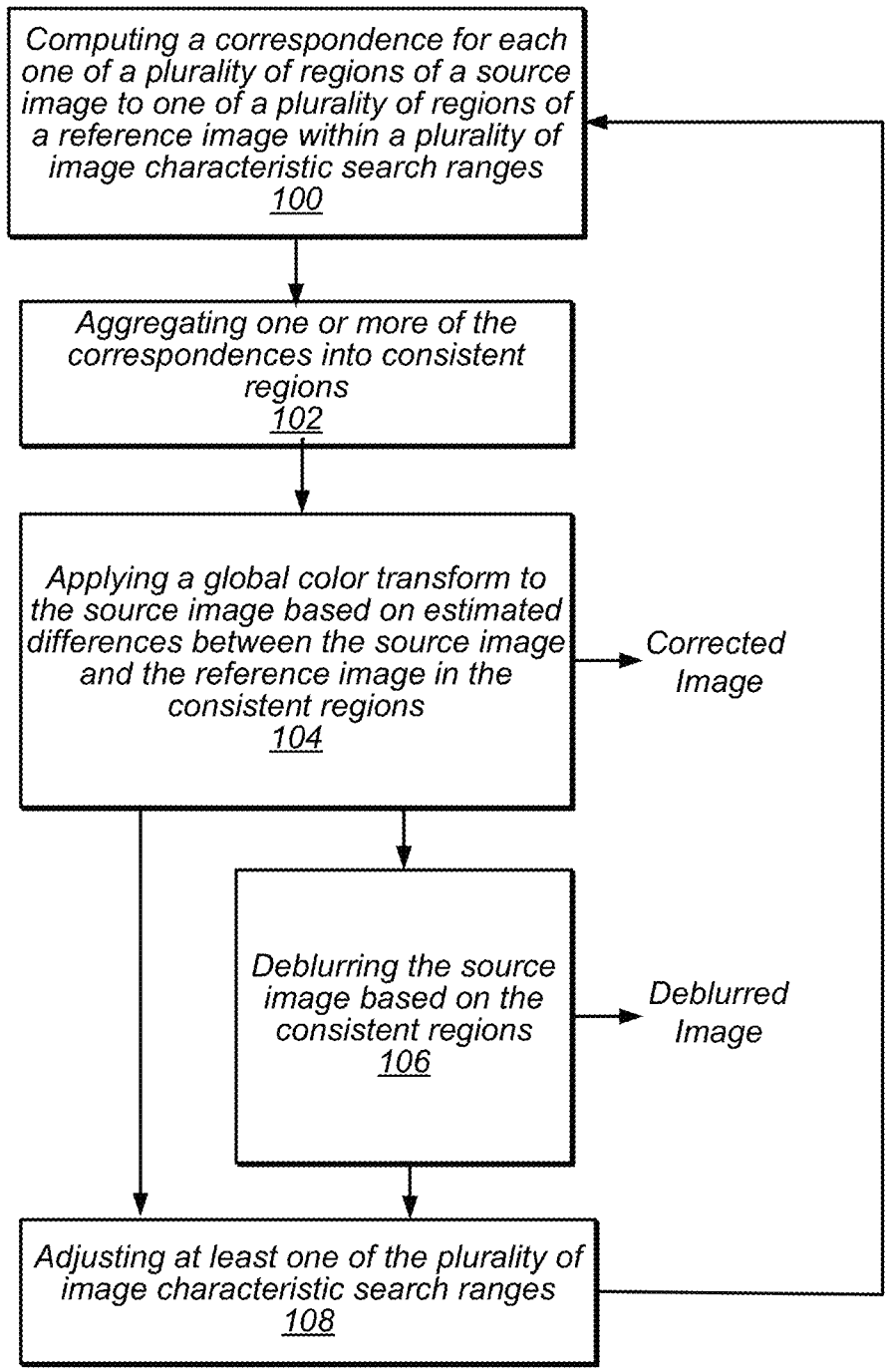
FIG. 1 is a flowchart of an example of non-rigid dense correspondence (NRDC), according to some embodiments.

While the disclosure is described herein by way of example for several embodiments and illustrative drawings, those skilled in the art will recognize that the disclosure is not limited to the embodiments or drawings described. It should be understood, that the drawings and detailed description thereto are not intended to limit the disclosure to the particular form disclosed, but on the contrary, the intention is to cover all modifications, equivalents and alternatives falling within the spirit and scope of the present disclosure. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

"First," "Second," etc. As used herein, these terms are used as labels for nouns that they precede, and do not imply any type of ordering (e.g., spatial, temporal, logical, etc.). For example, for a non-rigid dense correspondence module computing a correspondence for each one of a plurality of patches of a source image to one of a plurality of patches of a reference image, the terms "first" and "second" patches of the source image can be used to refer to any two of plurality of patches. In other words, the "first" and "second" images are not limited to logical patches 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Dense." As used herein, this term is used to describe that some correspondence between a reference and source image exists for a collection of regions, where inside each region, the correspondence is dense (e.g., a match per pixel).

"Non-rigid." As used herein, this term is used to describe content, such as an object, that can change point of view and shape. For example, people may be non-rigid whereas something that is rigid includes an object whose geometric change between two images can be approximately explained by a parametric 2D or 3D transformation (e.g., projective, affine, similarity, rigid, epipolar, etc.).

Various embodiments of methods and apparatus for non-rigid dense correspondence (NRDC) are described. Some embodiments may include a means for performing NRDC. For example, an NRDC module may compute a correspondence for each one of a plurality of patches of a source image to one of a plurality of patches of a reference image, aggregate one or more correspondences into matched, or consistent, regions, fit and apply a color transform to the source image, adjust one or more search ranges, and deblur a source image or blur a reference image. The NRDC module may, in some embodiments, be implemented by program instructions stored in a computer-readable storage medium and executable by one or more processors (e.g., one or more CPUs or GPUs) of a computing apparatus. The computer-readable storage medium may store program instructions executable by the one or more processors to cause the computing apparatus to perform the NRDC techniques, as described herein. Other embodiments may be at least partially implemented by hardware circuitry and/or firmware stored, for example, in a non-volatile memory.

Turning now to FIG. 1, one embodiment of non-rigid dense correspondence is illustrated. While the blocks are shown in a particular order for ease of understanding, other orders may be used. In some embodiments, the method of FIG. 1 may include additional (or fewer) blocks than shown. Blocks 100-108 may be performed automatically, may receive user input, or may use a combination thereof.

As illustrated at 100, a correspondence for each one of a plurality of patches of a source image to one of a plurality of patches of a reference image may be computed. A patch is used herein to describe a small region of pixels (e.g., 7×7, 8×8 or 9×9 pixels). The computation of correspondence may be performed by searching a search range for each of a plurality of image characteristics. The reference and source images may be the same or different format (e.g., HDR, JPEG, BMP, etc.). The reference and source images may differ in a number of ways. The images may be drastically different images, may be differently contrasted, and may be differently exposed. For example, the reference and source images may include similar subject matter and may have been taken under different conditions (e.g., illumination, composition, background, subject pose, etc.). In one embodiment, the reference and source images may include similar content but were taken at different exposures (e.g., reference image taken at high exposure, source image taken at low exposure). In some embodiments, the source and/or reference image may be derived from videos (e.g., frames of videos). In various embodiments, the source and reference images may be downsampled versions of original full-size, high-resolution images. In some embodiments, an initial performing of the method of FIG. 1 may be performed on downsampled versions of the full-size images but subsequent iterations of NRDC may be performed on increasingly less downsampled versions. Thus, multiple iterations of the NRDC image enhancement technique may be performed in a coarse-to-fine manner.

In some embodiments, image characteristics for corresponding search ranges may include one or more of: translation, rotation, scale, and color appearance (e.g., bias, gain, etc.). Each of the plurality of image characteristic search ranges may be predefined or may be set via user input. In one example, at the initial coarse scale, search ranges may be:
$T_x \Sigma [0, R_w]$,
$T_y \Sigma [0, R_h]$,
$T_{scale} \Sigma [0.33, 3]$,
$T_{rotation} \Sigma [-45°, 45°]$,
$T_{Lbias} \Sigma [-30, 20]$,
$T_{Lgain} \Sigma [0.2, 3]$,
$T_{Ggain} \Sigma [0.5, 2]$,
$T_{Gbias} = 0$,
$T_{Again} = 1$,
$T_{Bgain} = 1$.
$R_w$ and $R_h$ may be the width and height of the reference image, respectively, such that an initial translation search range may be over the full reference image.

In some embodiments, computing correspondences may include dense region matching that may be non-parametric. Small patches (e.g., 7×7 pixels, 8×8 pixels, 9×9 pixels, etc.) of the source image may be transformed by geometric and/or photometric transformation to match a corresponding patch of the reference image. Using such transformations may add to the robustness of the correspondences. As the images may not include a planar or rigid scene, matches/correspondences between the source and reference image can be found across significant changes in content or pose.

In one embodiment, for each patch in the source image, a matching patch may be found in the reference image. In determining the matching patch in the reference image, the search may be over a constrained range of translations, scale, rotations, gain, and bias value. In some embodiments, a nearest neighbor field is computed from the source image to the reference image. For each patch of the source image, a transformation $T^u$ may be determined that such that $T^u=\mathrm{argmin}_T\|S_u-R_{T(u)}\|_2$. In one embodiment, the transformation at each patch may include translation ($T_x$, $T_y$), rotation ($T_{rotation}$), uniform scale ($T_{scale}$), and color bias ($T_{bias}$) and gain ($T_{gain}$) per channel (e.g., the three channels of Lab color space). In another embodiment, the scale may be non-uniform. The transformations may locally approximate complicated global transformations such as non-rigid geometric change, color curves, etc. In some embodiments, non-integer numbers may be used for all match dimensions to achieve a sub-pixel accuracy. In one embodiment, the correspondence may be computed using random or approximated search interleaved with propagation of good matches between adjacent patches iteratively. As such, random values may be generated for the dimensions of the match, with each match containing 12 dimensions in some embodiments (e.g., translation_x, translation_y, scale, rotation, bias per channel, and gain per channel). Having the geometric dimension of a match candidate, the best match for gain and bias may be computed as described herein. In one embodiment, computing correspondence using random or approximated search interleaved with propagation of goods matches between adjacent patches iteratively may include initializing by random matches for each patch (where the random match may be constrained to the search range). It may also include repeating in multiple iterations: for each patch in a scan-line order, attempting to improve the patch's match by propagating the matches from the neighbors, and attempting to improve the patch's match by random matches (e.g., sampling from windows in different sizes around the best match so far). It may also include repeating in multiple iterations: for each patch in a reversed scan-line order, attempting to improve the patch's match by propagating the matches from the neighbors, and attempting to improve the patch's match by random matches (e.g., sampling from windows in different sizes around the best match so far).

In various embodiments, small overlapping patches of pixels (e.g., four by four pixels, eight by eight pixels, etc.) and a feature vector (e.g., four-dimensional) per pixel may be stored. The feature vector may include four channels of Lab color space and the magnitude of the luminance gradient at each pixel. In some embodiments, the color bias b and gain g between a patch of the source image and its candidate patch in the reference image may be obtained differently than the geometric search technique described above. For example, the color bias and gain may be obtained using the mean $\mu$ and the variance $\sigma^2$ of the pixels in each patch. The mean and variance may be computed by:

$$g(u)=\sigma(S(u)/\sigma(R_{T(u)}) \quad \text{(Eq. 1)}$$

$$b(u)=\mu(S_u)-g(u)\mu(R_{T(u)}) \quad \text{(Eq. 2)}$$

In one embodiment, T, in the above gain and bias equations, contains only the geometric portion of the candidate information. Moreover, in one embodiment, both the bias and gain may be clipped to lie within the current search range limits. The Gaussian-weighted mean and variance around the center of the patch may be used to make patch statistics rotation invariant. The Gaussian-weighted mean and variance may be precomputed and stored for each scale, and mipmaps may be used to obtain the mean and variance at the exact scale because variance is not scale invariant. In some embodiments, when comparing patches at different scales, the patches may be sampled from a mipmap data structure.

At 102, one or more of the correspondences may be aggregated into matched, or reliable, regions. Aggregating matches may improve robustness by having larger regions of consistent matches. In one embodiment, a consistency criterion may be applied to calculate a coherence error for a group of matches/correspondences together. If the coherence error is relatively small, the group of matches may be accepted as consistent. In various embodiments, aggregating includes determining candidate regions of the correspondences with neighboring pixels having a deviation below a threshold for at least some of the plurality of image characteristics. Aggregating may further include applying a global consistency measure to the candidate regions to determine the matched regions. Applying the global consistency measure may include a statistical determination if the region is consistent based on confidence.

Figure 2:
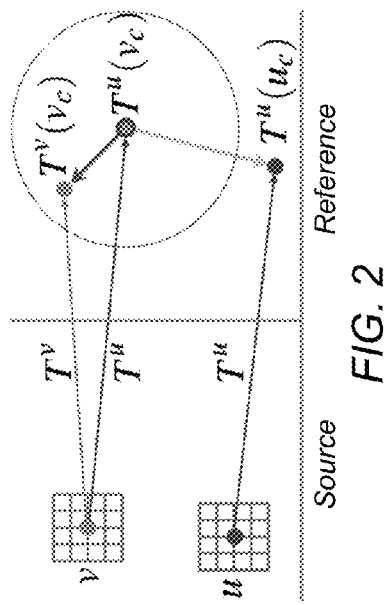
FIG. 2 is an illustration of aggregating matched regions, according to some embodiments.

In one embodiment, adjacent patches may be matched if their nearest-neighbor field transformations are similar. For instance, patches may be matched if they have similar geometry (e.g., transformation, rotation, scale). As an example, and with reference to FIG. 2, consider a pair of patches, u and v, from the source image with matched transformations $T^u$ and $T^v$, respectively. Let $v_c$ denote the coordinates of the center of patch v. If the two patches are matched consistently, the distance between $T^v(v_c)$ and $T^u(v_c)$ may be relatively small. In some embodiments, the distance between $T^v(v_c)$ and $T^u(v_c)$ may be normalized because the transformations might involve a scale. Accordingly, a consistency error between u and v may be defined as:

$$C(u,v) = \frac{\|T^v(v_c) - T^u(v_c)\|^2}{\|T^u(u_c) - T^u(v_c)\|^2} \quad \text{(Eq. 3)}$$

Using the consistency error C(u,v,), connected components of the graph whose nodes are the patches in S may be computed. Each patch u may be connected to its neighbor v if v is one of its four neighbors and if the consistency error is below a threshold: $C(u,v)<\tau_{local}$. Accordingly, matched regions may be obtained that include adjacent patch pairs that are matched whereas pairs of patches further apart may not be matched.

In various embodiments, a subset of most pairs or every pair of patches may be examined. For example, the subset, J(Z), may be from a region Z, which may be determined by sampling from pairs (u,v) within a certain range $\tau_{small}\le\|u_c-v_c\|<\tau_{large}$. The coherence error of the region, C(Z), may be defined as the ratio of the inconsistent pairs to the total number of pairs in J(Z):

$$C(Z) = \frac{|\{(u,v) \in J(Z) \text{ s.t. } C(u,v) - \tau_{global}\}|}{|J(Z)|} \quad \text{(Eq. 4)}$$

The regions whose coherency error is below a threshold $\tau_{ratio}$ may be accepted as matched regions. In some embodiments, regions for which $|Z|<\tau_{size}$ may be excluded from coherent, matched regions. Example values for the various thresholds may include $\tau_{local}=3$, $\tau_{global}=0.8$, $\tau_{ratio}=0.5$, $\tau_{size}=500$, $\tau_{small}=8$, and $\tau_{large}=64$. However, these are just example values and other values may be used for any of the threshold parameters.

Pixels in the unmatched, or eliminated, regions may be defined as outliers. Regions that have passed the above consistency tests may be considered reliable and may be used in block 104 to fit a global color transformation model, aligning the colors of the source image with the reference image, in block 106 for deblurring, and in block 108 to adjust the search ranges for subsequent iterations of the method of FIG. 1.

In one embodiment, blocks 100 and 102 may be used to find corresponding regions between images that do not exhibit large photometric difference (e.g., mostly geometrical ones). In that case, blocks 104-108 may not be performed and the output will be the correspondence. An indication of the one or more regions of the reference image that correspond to the source image may be stored. This may be useful in many cases (e.g., if a camera's parameters are fixed and it is known the scene's illumination did not change substantially).

As shown at 104, a color transform may be applied to the source image resulting in an updated source image. In various embodiments, the color transform may be based on estimated differences between the source image and the reference image in the matched regions. The color transformation may be global in the sense that it may be used to map all of the colors in the source image, and not just in regions where a reliable correspondence has been established. In various embodiments, the color transform may be flexible enough to capture and recover various color difference, yet be conservative when only a small part of the color gamut appears in the reliably matched regions. The color transform may reproduce complex variations such as saturation and nonlinear tone curve adjustments. The color transform may further provide a meaningful mapping for colors that do not appear in the reliably matched regions in the source image. In one embodiment, the color transform may be a parametric model that can be applied to predict a reasonable mapping for colors that do not appear in the input correspondences. The parametric model may capture common global image adjustments and discrepancies between different imaging devices. The parametric model may further be stored in a meaningful and compact way for further adjustments (e.g., manual or automatic).

In some embodiments, a plurality of curves may be fit to generate the color transform. For example, in one embodiment, an algorithm may fit three monotonic curves, one per channel of the RGB color space, followed by a linear transform to accommodate saturation changes. To model each of the curves, a piecewise cubic spline may be used. The piecewise cubic spline may include 7 breaks: two at the ends of the gamut range (e.g., zero and one), and five uniformly distributed along the subrange on the gamut populated by reliable correspondences. Soft constraints may be applied to the RGB curves outside the color range with known correspondence, so that they tend toward the identity transformation and for robustness to outliers. Each of the RGB curves may be constrained to pass through the points $y(-0.1)=-0.1$ and $y(1.1)=1.1$ as well as impose hard monotonicity $y'(x) \geq 0.1$. Accordingly, manipulations such as gamma changes may be captured by the curve yet allow for conservativeness where not enough data exists. Quadratic programming may solve for the curves' degrees of freedom.

In one embodiment, saturation changes may not be modeled solely by independent color channel curves. In such an embodiment, a matrix with one degree of freedom, a uniform scale about the gray line, may be used. To compute the matrix, pixel colors may be projected from both images along the gray line, which may eliminate luminance variation, and may optimize for the scale factor s that best fits the corresponding chrominances alone. The resulting matrix may be as follows:

$$\begin{pmatrix} s-w_r & w_g & w_b \\ w_r & s-w_g & w_b \\ w_r & w_g & s-w_b \end{pmatrix} \quad \text{(Eq. 5)}$$

Because the gray model may be generally unknown, the matrix may be fit twice for two common models: once with uniform weights $(w_r, w_g, w_b)=(1,1,1)/3$ and once using the YUV color space $(w_r, w_g, w_b)=(0.2989, 0.587, 0.114)$. The one that best minimizes the loss function may be chosen. Note that other gray models may be similar. In some embodiments, if the color transformation model is known beforehand (e.g., by the image metadata or from the camera manufacturer), then the known model can be fitted instead. Specifically, if a gray model is known to be better in some context, the known gray model may be used without fitting the two common models described above.

In subsequent iterations of the method of FIG. 1, the updated source image may be used such that the correspondences that are computed at block 100 are computed for each one of a plurality of patches of the updated source image to one of the plurality of patches of the reference image. In some cases, the global color transformation may iteratively improve the performance of the correspondence algorithm of block 100 by narrowing the search range of the local patch transformation parameters, as described at 108.

After one or more iterations of the method of FIG. 1, the final corrected image may be produced at block 104. After the final corrected image is produced, the search ranges may not need to be adjusted at block 108.

In various embodiments, the global color transfer of block 104 may be preceded or followed by a further local color adjustment using the correspondences of block 100. In some instances, the local transformation may also be part of the iterative process. In one embodiment, the colors inside the reliable correspondence regions may be adjusted locally. The changes from the boundaries of the regions can then be propagated to the rest of the image, for instance, by using Poisson blending. For a description of Poisson blending, see PÉREZ, P., GANGNET, M., AND BLAKE, A. 2003, Poisson Image Editing, ACM Trans. Graph. 22, 3 (July), 313-318.

Figure 11:
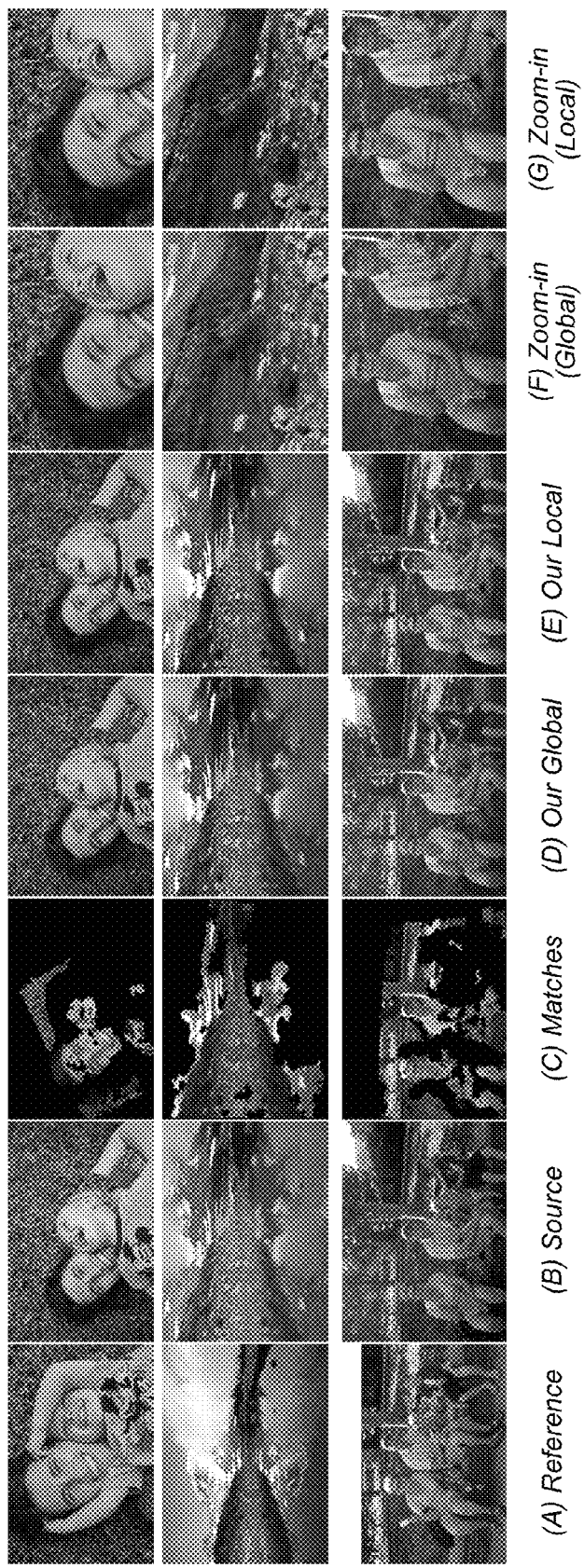
FIG. 11 illustrates examples of local color adjustment, according to some embodiments.

Any local adjustments inside the matched regions may be performed, in one embodiment, using locally adaptive histogram matching. The image may be subdivided into blocks, a transfer function may be calculated, and results may be interpolated. Because a set of pixel-to-pixel correspondences exists between the source and the reference images, histogram matching may be performed to locally match the color of each block of the image centered at a matched pixel with the corresponding block in the reference image. Three examples of local color adjustment, one in each row, can be seen in FIG. 11. The columns from left to right represent: reference images, source images, correspondences/matches, global color transform result, local color adjustment result, zoomed-in global result, and zoomed-in global result. As shown in the top and bottom rows, local adjustments may result in improved flesh tones while a more accurate, darker shade of green may result from the local adjustment in the middle row.

In some embodiments, the non-rigid dense correspondence method of FIG. 1 skips block 106 and proceeds directly to block 108. In other embodiments, the deblurring of block 106 occurs in addition to the global color transfer of block 104. Still, in other embodiments, the deblurring of block 106 occurs instead of the global color transfer of block 104.

As shown at 106, the source image or updated source image may be deblurred based on the matched regions. In one embodiment, a source image may be deblurred using the non-rigid dense correspondences. For example, a blur kernel may be estimated using the non-rigid dense correspondences between blurred pixels and sharp pixels. By interleaving the blur kernel and deconvolution into the correspondence method of FIG. 1, accurate correspondence can be found even with large blur kernels. The effective kernel at the coarsest resolution may be small and may be computed effectively from the correspondences at that scale, which can be further improved after each deconvolution. In some instances, the kernel may be upsampled when moving to the next scale, which may produce a sharper deconvolved initial source image. The deblurring of 106 may occur with each iteration of the NRDC technique until the finest scale yields a final kernel and deconvolved, deblurred image.

In one embodiment, the blur kernel may be estimated using a validity mask in addition to the sharp reference and blurry source images. The estimation may be done for pixels inside the validity mask. As described above, in one case, the blurry input image is the color adjusted source image resulting block 104. A sharp image may be synthesized by assigning colors in the matched regions of the source image using the corresponding reference locations. The validity mask marks consistent pixels in the blurry input image. After kernel estimation, the blurry input image may be deconvolved to create a deblurred image. In one embodiment, deconvolution is performed using sparse deconvolution.

Figure 12:
FIG. 12 illustrates examples of deblurring an image, according to some embodiments.

As shown in the two examples of FIG. 12, interleaving the blur kernel and deconvolution into the NRDC technique may improve results over other methods. The first two columns of FIG. 12 show a sharp reference image and a blurry source image, respectively. The next two columns illustrate other techniques for deblurring by blind deconvolution methods and the final column illustrates the improved results of the technique of FIG. 1.

Turning back to FIG. 1, as illustrated at 108, at least one of the search ranges may be adjusted. In some instances, adjusting one of the search ranges may include narrowing the search range of one of the transformations. As an example, the search ranges for one or more of the transformations may be narrowed around the transformations that were found in the previous iteration. As described herein, the method of FIG. 1 may be performed iteratively. As an example, the iterations may be performed in a coarse-to-fine manner. At each subsequent scale, one or more of the search ranges may be adjusted using parameters of the matched transformation in the reliable, matched regions. Example search range adjustments can be seen in FIG. 3.

Referring back to FIG. 1, in some embodiments, the search range of the geometric transformations may be changed locally, and in some cases, just in the reliable regions. As a result, adjusting may include adjusting one of the search ranges for the matched regions differently than adjusting a corresponding image characteristic search range for unmatched regions. As an example, for each of the reliable matches, the search of the geometric parameters may be constrained around its current values. For instance, the search can be constrained using a radius of 4 pixels for the translations, a range of scales between 90% and 110% of the current best scale, and 4 degrees for rotation. Furthering the example, the search ranges of the geometric parameters in non-reliable, unmatched regions may not be narrowed. Color gain and bias may, however, be adjusted for both unmatched and matched regions in various embodiments.

Although a single consistent global color transformation may not always exist, the range of the gain and bias correspondences for the reliable correspondences, combined with the global color correction, can capture the gain and bias that are required for the rest of the image. As a result, $T_{Lbias}$, $T_{abias}$, $T_{bbias}$, $T_{Lgain}$, and $T_{Ggain}$ may be computed for each of the reliable matches with respect to the color corrected image. A global search range may be set for the color parameters as:

$$T_x \in \left[ \min_{T^u \in Q(S)} (T_x^u), \max_{T^u \in Q(S)} (T_x^u) \right]$$

where Q(S) includes the reliable matches and $T_x$ represents each of the color parameters. In some cases, if the total area of the reliable regions is less than a certain amount of the source image size (e.g., 0.5%, 1%, 2%, etc.), the initial search range may be used with no global color correction.

In some embodiments, the method of FIG. 1 may be run several times with different initial search ranges with the reliable matches from each pass being aggregated. In other embodiments, the source image may be divided into regions and the method of FIG. 1 may be applied on each region separately. In another embodiment, the method of FIG. 1 may be run again on the source image after excluding the matched regions from the last time, which may allow additional shared regions to be found, until no more regions match. Such variations may yield improvements in cases in which two or more very different color models are present (e.g., under strong lighting changes, images with local user edits, etc.) as well as cases with hue rotations, manipulations used to emulate chemical film development processes, or images obtained through actual chemical film development processes.

Using the interleaved, non-rigid dense correspondence techniques of FIG. 1 may allow for recovery of both a robust set of dense correspondences between sufficiently similar regions in two images and a global non-linear parametric color transformation model. The techniques may also extend the operating range in which using shared content to enhance images can be applied. As such, the method of FIG. 1 may robustly find shared content, including but not limited to faces, people, static, and non-static content. In some cases, the techniques of FIG. 1 may also be robust to significant tonal differences between the images.

Figure 3:
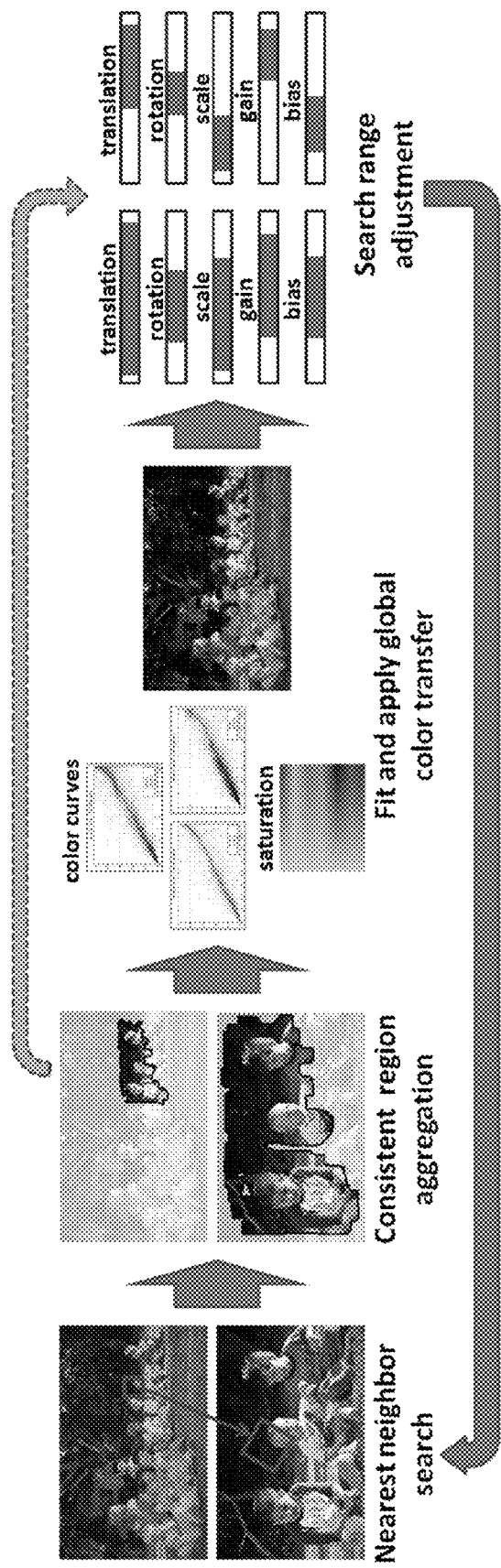
FIG. 3 illustrates an example application of the NRDC method, according to some embodiments.

FIG. 3 illustrates an example application of the method of FIG. 1 given a reference image (bottom) and a source image (top). The leftmost image pair illustrates a sample correspondence matching from a source image to a reference image. The highlighted square in each image shows one of the sets of correspondences. In the sample matching illustrated in FIG. 3, a nearest neighbor search was performed to find the correspondences. The second image pair from the left in FIG. 3 shows matched region aggregation. The shaded areas indicate areas of consistent correspondences (about 50% of the reference image and about 10% of the source image), which corresponds to similar regions that appear in both images. FIG. 3 also shows an example global color transfer fit and application to modify the source image to match the tonal characteristics of the reference image. Shown are three color curves as well as a saturation model. As shown, the global color transfer is applied to the reference image. FIG. 3 further illustrates an example search range adjustment for translation, rotation, scale, gain, and bias. Note that in the example shown, each of the search ranges has been narrowed. In some cases, however, one or more of the search ranges may not narrow.

Figures 4A, 4B, 4C, 4D, 4E:
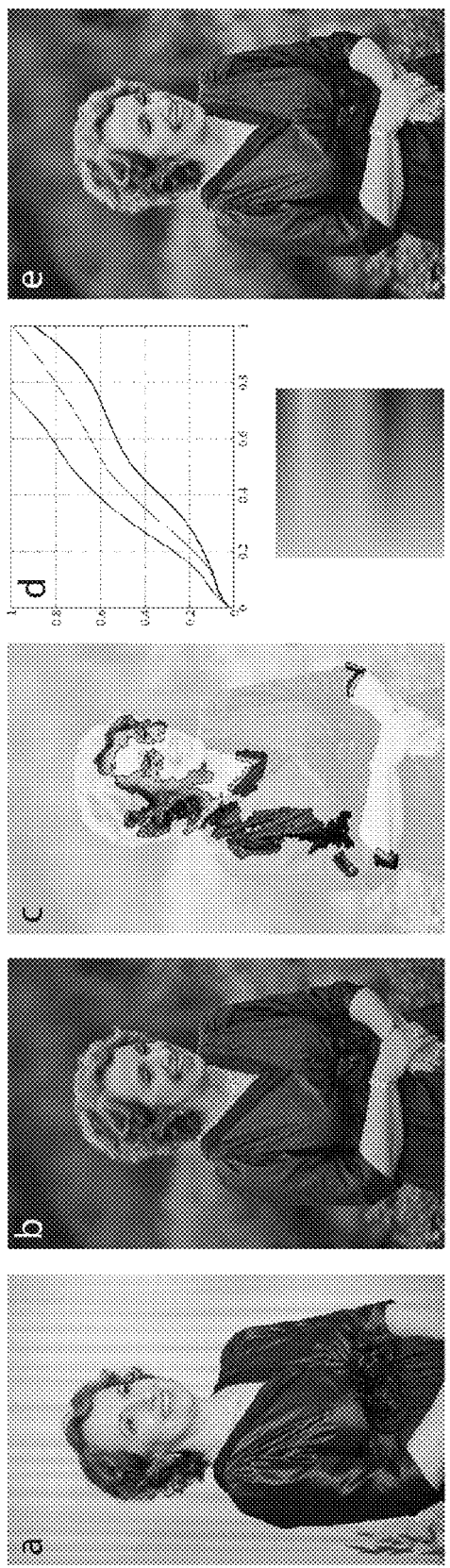
FIGS. 4A-4E illustrate an example color transfer application, according to some embodiments.

FIG. 4A-4E (in grayscale) represent an example color transfer according to the method of FIG. 1. FIG. 4A is a reference image that was taken indoors using a flash while FIG. 4B is a source image taken outdoors, against a completely different background, and under natural illumination. Further, the pose of the subject is different in FIGS. 4A and 4B. FIG. 4C illustrates the correspondence detection of the woman's face and dress as shared content. FIG. 4D illustrates a parametric color transfer model generated by the method of FIG. 1. FIG. 4E illustrates the corrected source image. Note that the appearance of the woman in the corrected, updated source image matches the reference image.

Figure 5:
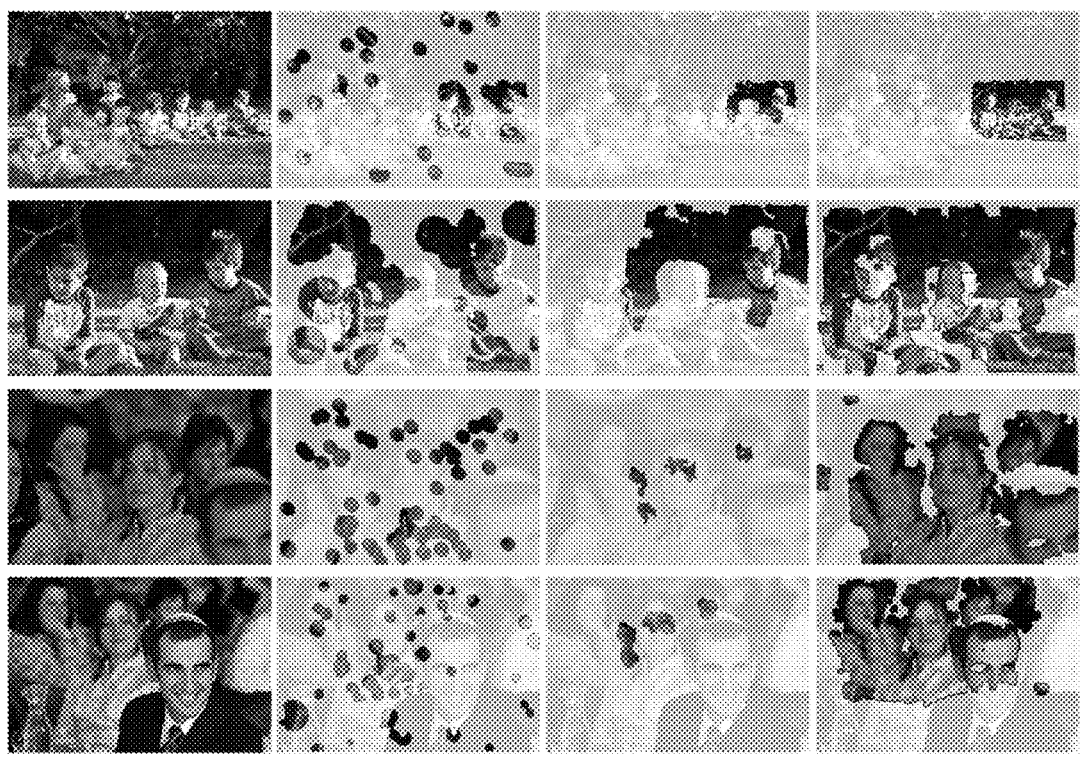
FIG. 5 illustrates a qualitative comparison of various techniques for generating correspondences, according to some embodiments.

FIG. 5 illustrates a qualitative comparison of the sparse scale-invariant feature transform (SIFT) technique, the Generalized PatchMatch (GPM) technique, and the method of FIG. 1 on two pairs of real-world scenes. The GPM technique is described in BARNES, C., SHECHTMAN, E., GOLDMAN, D. B., AND FINKELSTEIN, A. 2010, The Generalized PatchMatch Correspondence Algorithm, In Proc. ECCV, vol. 3, 29-43. The leftmost column, from top to bottom, includes a source image, reference image, a second source image, and a second reference image. The second column from the left shows correspondences of the two image pairs for the sparse SIFT technique. Note the matches are typically very sparse and contain many errors that cannot be filtered easily in the presence of non-rigidly moving people. The third column from the left illustrates correspondences of the two image pairs for the GPM technique. Note that the results of the GPM technique also do not produce large matched regions. The rightmost column is an example of correspondences according to the method of FIG. 1. The examples produced by the method of FIG. 1 include larger, more reliable matches than the examples produced by sparse SIFT and GPM.

Figure 6:
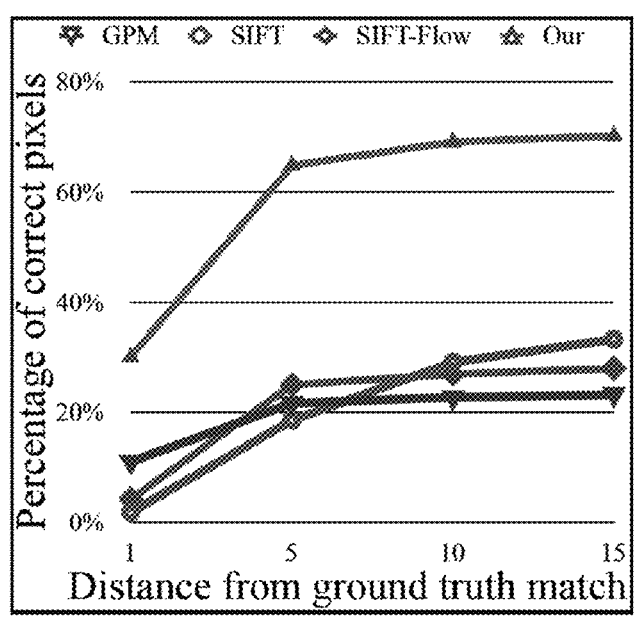
FIG. 6 illustrates a quantitative comparison of various techniques for generating correspondences, according to some embodiments.
Figure 7:
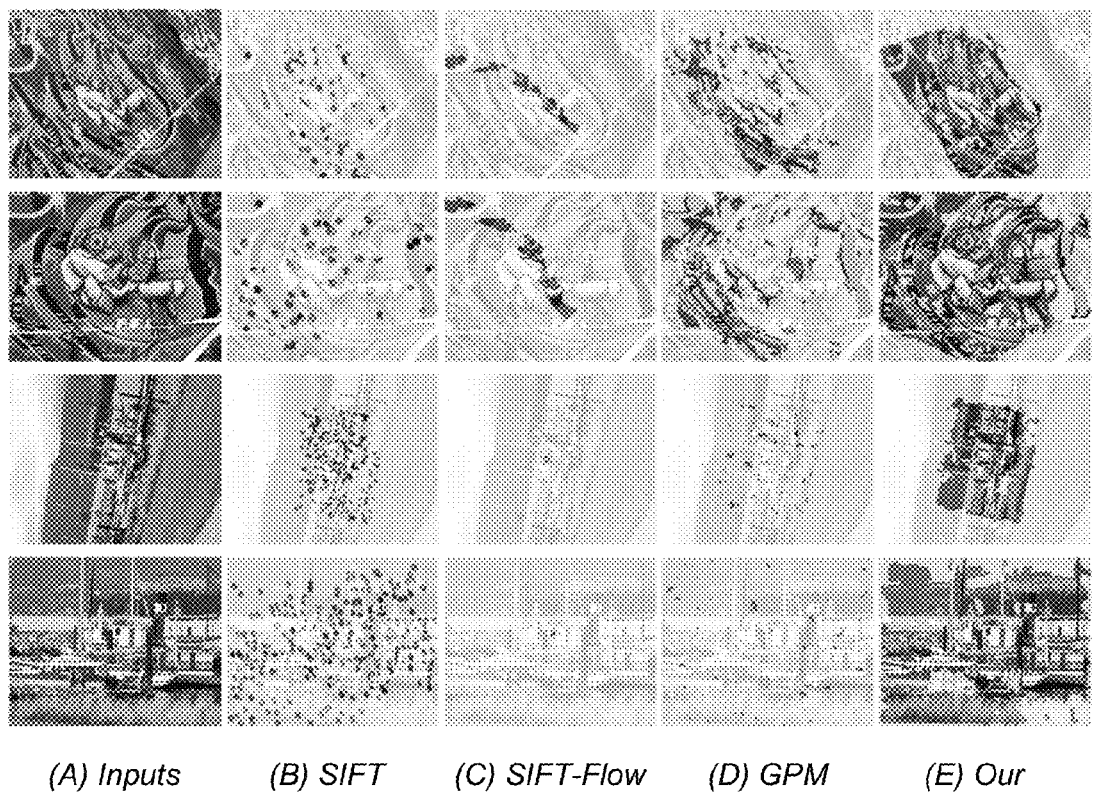
FIGS. 7-8 illustrate additional qualitative comparisons of various techniques for generating correspondences, according to some embodiments.

FIG. 6 illustrates a quantitative comparison of various techniques for generating correspondences with the method of FIG. 1. The comparison included real scenes for which ground truth data exists. The images used in generating the quantitative data in FIG. 6 includes significant planar geometric transformations as well as differences in sharpness, exposure, and JPEG compression. FIG. 6 illustrates a plot of the percent of correct matches relative to the total number of input pixels with matches, as a function of r (average over all pairs in the dataset). As shown, the method of FIG. 1 significantly outperforms SIFT, GPM, and SIFT-flow for this example image dataset with realistic transformations. FIG. 7 shows a corresponding qualitative comparison from the same dataset used for the plot of FIG. 6. Note once again that the correspondences computed by the method of FIG. 1 includes larger, more reliable matches than the techniques of SIFT, SIFT-Flow, and GPM.

Figure 8:
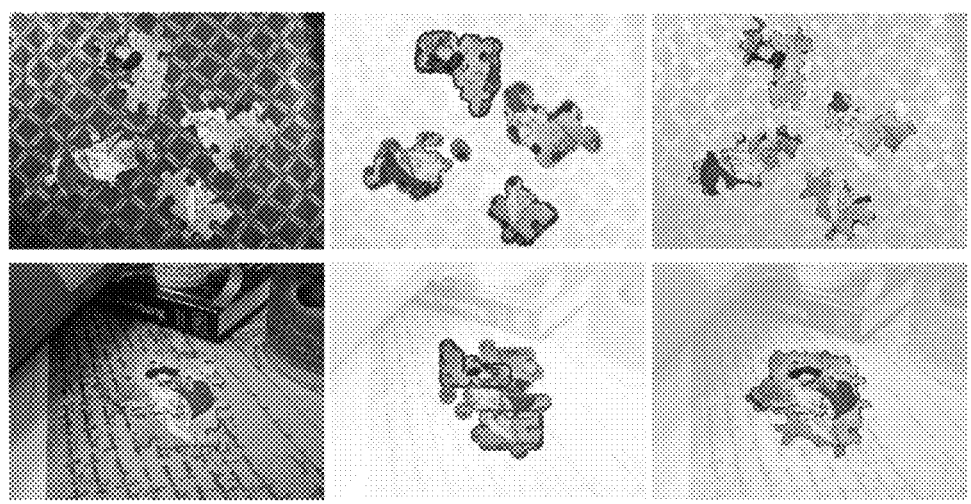

FIG. 8 illustrates yet another qualitative comparison with the Co-recognition technique described in CHO, M., SHIN, Y. M., AND LEE, K. M., Co-recognition of Image Pairs by Data-driven Monte Carlo Image Exploration, In Proc. ECCV 2008, vol. 4, 144-157. Shown in FIG. 8 is an example data pair in the leftmost column, correspondences from the Co-recognition technique in the middle column, and correspondences from the method of FIG. 1 in the rightmost column. For the example dataset, the correspondences generated by the method of FIG. 1 outperformed the Co-recognition technique with a hit-ratio of 86.9% to 85.5%, with the hit-ratio quantifying coverage of the common regions as opposed to pixel-wise correspondence accuracy. The method of FIG. 1 may produce more accurate object boundaries, may be more accurate inside objects, and may operate in a much wider range than the Co-recognition technique.

Figure 9A:
Figure 9B:
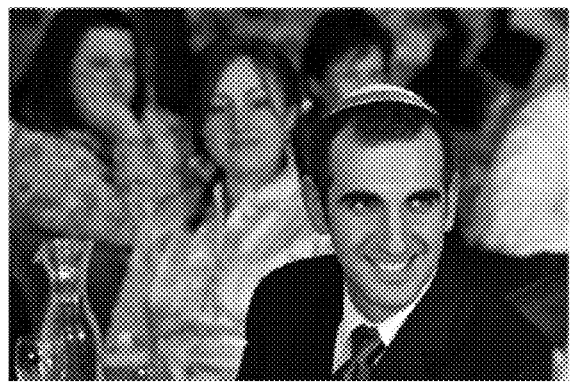
Figure 9C:
Figure 9D:

As described herein, the global parametric color transformation model may be used to automatically adjust the color and exposure of the source image to match the reference image. FIGS. 9A-10C illustrate representative results. FIGS. 9A and 9B are source and reference images, respectively. FIG. 9C was produced with the Pitié technique and FIG. 9D was produced with the technique of FIG. 1. The Pitié technique is described in PITIÉ, F., KOKARAM, A. C., AND DAHYOT, R., Automated Colour Grading Using Colour Distribution Transfer, Comput. Vis. Image Underst. 107 (July 2007), 123-137. As shown, the statistical color transfer method of Pitié produces poor results when two images have different color statistics in non-overlapping regions. FIGS. 10A-C illustrate another example comparison of color transfer results. FIG. 10A is the result of the statistical color transfer method of Pitié, FIG. 10B is the result of the SIFT technique, and FIG. 10C is the result of the method of FIG. 1.

As shown, the results of the NRDC technique of FIG. 1 show that it significantly outperforms the Pitié and SIFT techniques.

Figure 13:
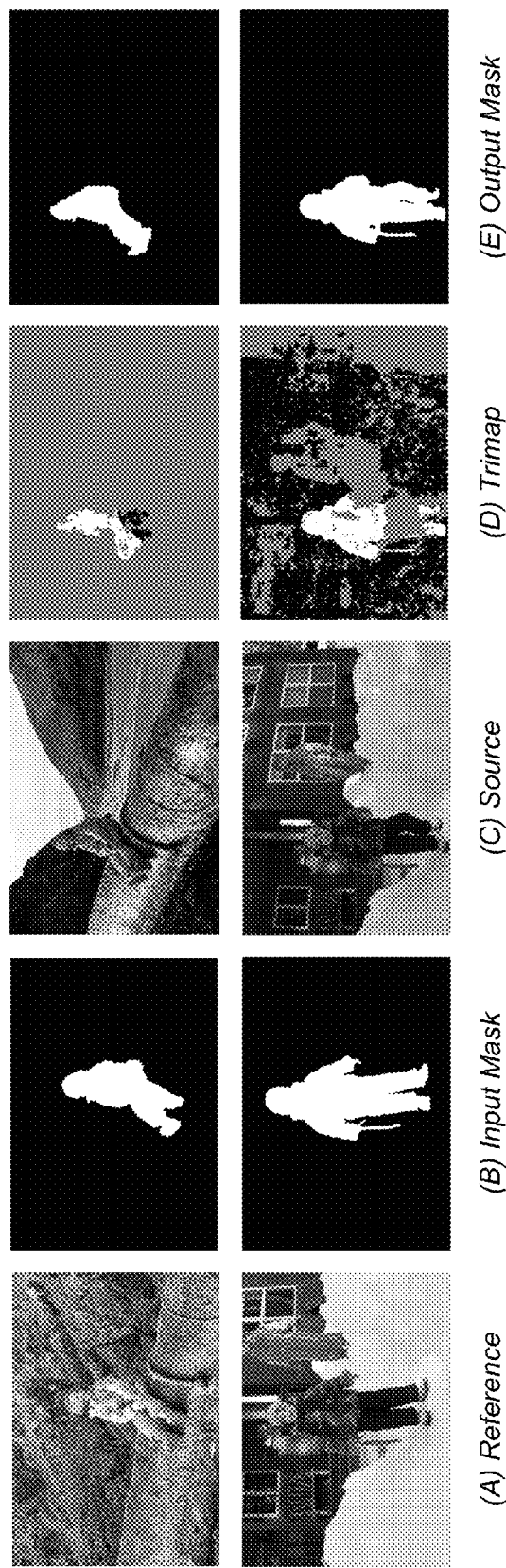
FIG. 13 illustrates an example mask transfer application, according to some embodiments.

FIG. 13 illustrates another example application, mask transfer, of the NRDC techniques described herein. Given a mask for an object in the reference image, applying the NRDC techniques may allow for that mask to transfer to the same object in another image. Example reference images can be seen in the leftmost column of FIG. 13, example input masks in the second column, and example source images in the middle column. In one embodiment, given the mask for the reference image, matched corresponding regions may be found between the two images, as described herein. Pixels in the input image that correspond to the masked pixels in the reference image may be marked as known object pixels. Pixels in the input image that correspond to the complement of the masked pixels in the reference image may likewise be marked as known background. The remaining pixels may be marked as unknown. Unknown regions may be completed in the source image with trimap-based segmentation, or other techniques. Trimap-based segmentation may take into account color similarity of adjacent pixels. An example of known object pixels, known background pixels, and unknown pixels can be seen in the fourth column of FIG. 13 as white, black, and grey, respectively. The known regions may, in some embodiments, be slightly eroded, which may help avoid crosstalk. The known regions may then be used as foreground/background initialization for segmentation. Results for two examples are shown in the last column of FIG. 13.

In addition to global and local color transfer, deblurring, and mask transfer as described herein, other example applications of the non-rigid dense correlation method of FIG. 1 may include: high dynamic range (HDR) by example, Super-Resolution by example, similar image retrieval applications from multiple images, 3D reconstruction, object recognition, Optical-Flow, stereo matching (e.g., finding the depth map in a stereo pair), object label transfer, other situations in which a dense correlation between two images is used, etc.

EXAMPLE SYSTEM

Figure 14:
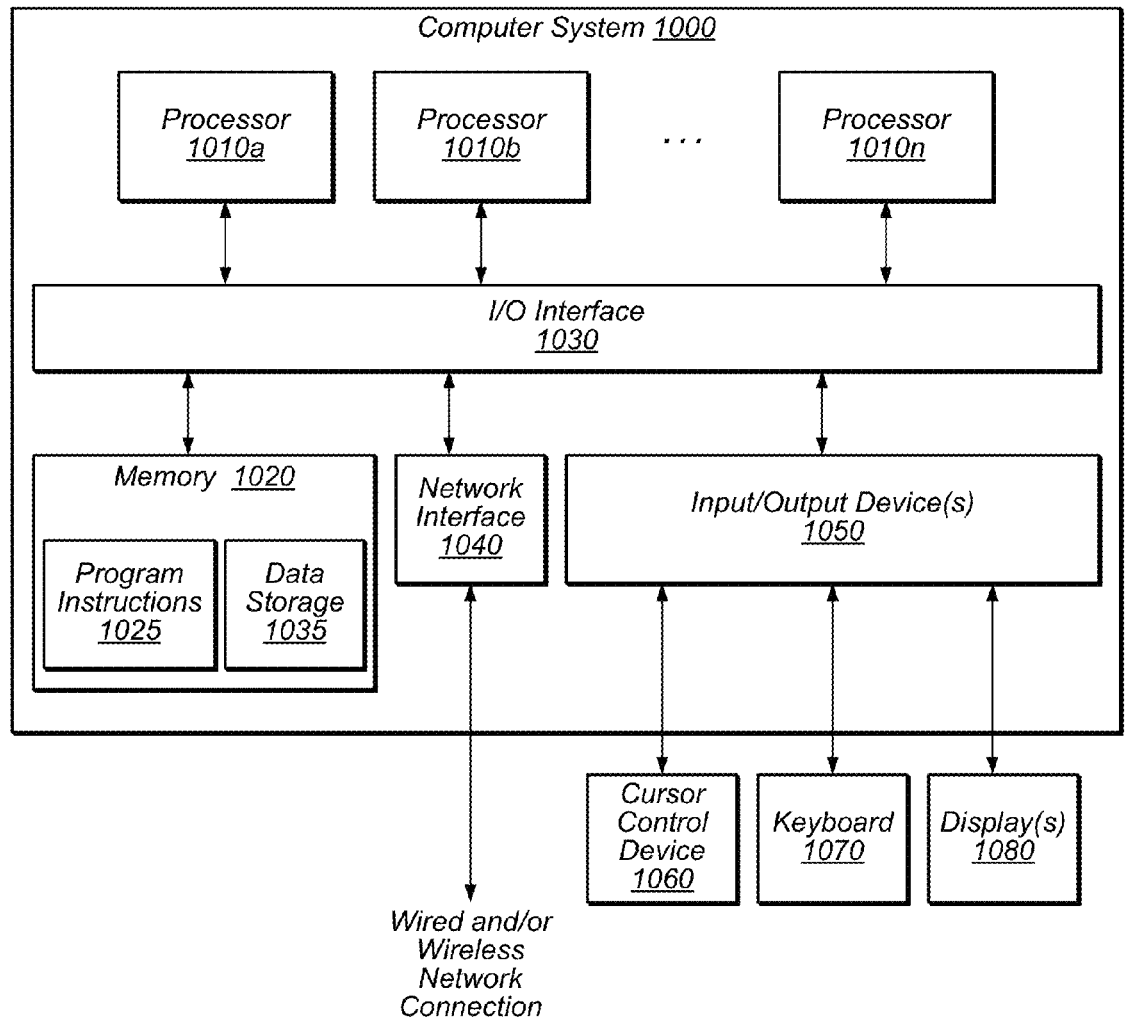
FIG. 14 illustrates an example computer system that may be used in accordance with one or more embodiments.

Embodiments of the NRDC techniques as described herein may be executed on one or more computer systems, which may interact with various other devices. One such computer system is illustrated by FIG. 14. In various embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, tablet device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of the NRDC techniques are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 14, memory 1020 may include program instructions 1025, configured to implement embodiments of the NRDC image enhancement techniques as described herein, and data storage 1035, comprising various data accessible by program instructions 1025. In one embodiment, program instructions 1025 may include software elements of embodiments of the NRDC image enhancement techniques as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of the NRDC techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the disclosed embodiments may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the embodiments embrace all such modifications and changes and, accordingly, the above description to be regarded in an illustrative rather than a restrictive sense.

What is claimed is:

1. A method, comprising:
    computing a correspondence for each one of a plurality of patches of a source image to one of a plurality of patches of a reference image, the computing includes searching within a search range for each of a plurality of image characteristics;
    aggregating one or more of the correspondences into matched regions; and
    applying a global color transform to the source or reference image resulting in an updated image, the global color transform based on estimated differences between the source image and the reference image in the matched regions.

2. The method of claim 1, further comprising:
    iteratively performing said computing, aggregating, and applying using the updated image.

3. The method of claim 2, wherein said iteratively performing is performed in a coarse-to-fine manner.

4. The method of claim 1, wherein the computed correspondences are non-rigid dense correspondences.

5. The method of claim 1, wherein said computing includes utilizing a nearest neighbor technique.

6. The method of claim 1, further comprising:
    adjusting at least one of the search ranges; and
    repeating said computing, aggregating, and applying for the updated image based on the at least one adjusted search range.

7. The method of claim 6, wherein said adjusting includes adjusting one of the search ranges for patches in the matched regions differently than adjusting a corresponding image characteristic search range for patches in unmatched regions.

8. The method of claim 1, wherein said aggregating includes:
    determining candidate regions of the correspondences with neighboring pixels having a deviation below a threshold for at least some of the plurality of image characteristics; and
    applying a global consistency measure to the candidate regions to determine the matched regions.

9. The method of claim 1, further comprising locally adjusting color of the updated image based on the matched regions.

10. The method of claim 1, further comprising:
    estimating a blur kernel based on a pixel-to-pixel correspondence in the matched regions; and
    deconvolving the source image with the estimated blur kernel.

11. A method, comprising:
    computing a dense correspondence for each one of a plurality of patches of a source image to one of a plurality of patches of a reference image, the computing includes searching within a search range for each of a plurality of image characteristics;
    aggregating one or more of the correspondences into matched regions; and
    deblurring the source image resulting in a deblurred image, the deblurring based on the matched regions.

12. The method of claim 11, wherein said deblurring includes:
    estimating a blur kernel based on a pixel-to-pixel correspondence in the matched regions; and
    deconvolving the source image with the estimated blur kernel.

13. The method of claim 11, further comprising:
    iteratively performing said computing, aggregating, and deblurring for the deblurred image in a coarse-to-fine manner.

14. The method of claim 11, further comprising before said deblurring the source image, applying a color transform to the source image.

15. A non-transitory computer-readable storage medium comprising stored program instructions that are executable and, responsive to execution of the program instructions by a computing device, the program instructions are computer-executable to implement:
    computing a correspondence for each one of a plurality of patches of a source image to one of a plurality of patches of a reference image, the computing includes searching within a search range for each of a plurality of image characteristics;

aggregating one or more of the correspondences into matched regions; and applying a global color transform to the source or reference image resulting in an updated image, the global color transform based on estimated differences between the source image and the reference image in the matched regions.

16. The non-transitory computer-readable storage medium of claim 15, wherein the program instructions are further computer-executable to implement:

iteratively performing said computing, aggregating, and applying for the updated source image in a coarse-to-fine manner.

17. The non-transitory computer-readable storage medium of claim 15, wherein said aggregating includes:

determining candidate regions of the correspondences with neighboring pixels having a deviation below a threshold for at least some of the plurality of image characteristics; and applying a global consistency measure to the candidate regions to determine the matched regions.

18. The non-transitory computer-readable storage medium of claim 15, wherein the program instructions are further computer-executable to implement:

adjusting at least one of the search ranges; and repeating said computing, aggregating, and applying for the updated image based on the at least one adjusted search range.

19. The non-transitory computer-readable storage medium of claim 15, wherein the program instructions are further computer-executable to implement:

deblurring the updated source image, wherein said deblurring is based on the matched regions.

20. The non-transitory computer-readable storage medium of claim 19, wherein said deblurring includes:

estimating a blur kernel based on a pixel-to-pixel correspondence in the matched regions; and deconvolving the updated source image with the estimated blur kernel.

21. A method, comprising:

computing a correspondence for each one of a plurality of patches of a source image to one of a plurality of patches of a reference image, the computing comprises, for each patch of the source image, finding a corresponding patch of the reference image, the finding comprises searching over a plurality of transformations between each patch of the source image and a plurality of patches of the reference image;

determining adjacent patches of the reference image having a correspondence to patches of the source image at a transformation within a similarity threshold;

aggregating the determined adjacent patches of the reference image into one or more regions; and storing an indication of the one or more regions of the reference image that correspond to the source image.

22. The method of claim 21, further comprising:

identifying pixels in the source image that correspond to masked pixels in the reference image as transferred masked pixels;

identifying known background regions in the source image that correspond to a complement of the masked pixels in the reference image; and completing unknown regions in the source image with trimap-based segmentation that uses color similarity of adjacent pixels, wherein the unknown regions include regions not identified as transferred masked pixels or known background regions.

23. The method of claim 21, wherein said computing, determining, aggregating, and storing is iteratively performed in a coarse-to-fine manner.

24. A non-transitory computer-readable storage medium comprising stored program instructions that are executable and, responsive to execution of the program instructions by a computing device, the program instructions are computer-executable to implement:

computing a correspondence for each one of a plurality of patches of a source image to one of a plurality of patches of a reference image, the computing includes searching within a search range for each of a plurality of image characteristics;

aggregating one or more of the correspondences into matched regions;

locally adjusting color of the source image based on the matched regions; and iteratively performing said computing, aggregating, and locally adjusting in a coarse-to-fine manner.

* * * * *